United States Patent
Bailey

(10) Patent No.: US 10,599,454 B2
(45) Date of Patent: Mar. 24, 2020

(54) DATABASE SYSTEMS AND RELATED METHODS FOR VALIDATION WORKFLOWS

(71) Applicant: salesforce.com, inc., San Francisco, CA (US)

(72) Inventor: Samuel William Bailey, Cardiff (GB)

(73) Assignee: salesforce.com, inc., San Francisco, CA (US)

( * ) Notice: Subject to any disclaimer, the term of this patent is extended or adjusted under 35 U.S.C. 154(b) by 200 days.

(21) Appl. No.: 15/701,297

(22) Filed: Sep. 11, 2017

(65) Prior Publication Data

US 2017/0371690 A1    Dec. 28, 2017

Related U.S. Application Data

(63) Continuation-in-part of application No. 15/412,370, filed on Jan. 23, 2017, now Pat. No. 9,762,589, which is a continuation of application No. 14/489,183, filed on Sep. 17, 2014, now Pat. No. 9,569,238, which is a continuation of application No. 13/116,657, filed on May 26, 2011, now Pat. No. 8,863,119.

(60) Provisional application No. 61/349,135, filed on May 27, 2010.

(51) Int. Cl.
G06F 9/455    (2018.01)
G06F 16/11    (2019.01)
G06F 16/2457    (2019.01)
G06F 8/656    (2018.01)

(52) U.S. Cl.
CPC .......... *G06F 9/45533* (2013.01); *G06F 8/656* (2018.02); *G06F 9/45504* (2013.01); *G06F 16/113* (2019.01); *G06F 16/24575* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

*Primary Examiner* — Kenneth Tang
(74) *Attorney, Agent, or Firm* — LKGlobal | Lorenz & Kopf, LLP

(57) ABSTRACT

Computing systems, database systems, and related methods are provided for supporting dynamic validation workflows. One exemplary method involves a server of a database system receiving a graphical representation of a validation process from a client device coupled to a network, converting the graphical representation of the validation process into validation code, and storing the validation code at the database system in association with a database object type. Thereafter, the validation process is performed with respect to an instance of the database object type using the validation code in response to an action with respect to the instance of the database object type in a database of the database system. The action triggering the validation process can be based on user-configurable triggering criteria, and the validation process may generate user-configurable notifications based on one or more field values of the database object instance.

15 Claims, 11 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,542 B2 * | 6/2006 | Daly ................ G06F 9/542 717/116 |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,863,119 B2 | 10/2014 | Wood et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015832 A1 * | 1/2004 | Stapp ................ G06F 8/30 717/106 |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0262194 A1 * | 11/2005 | Mamou ................ G06F 16/254 709/203 |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

* cited by examiner

DATABASE SYSTEMS AND RELATED METHODS FOR VALIDATION WORKFLOWS

CROSS-REFERENCE TO RELATED APPLICATIONS

This application is a continuation-in-part of U.S. patent application Ser. No. 15/412,370, filed Jan. 23, 2017, which is a continuation of U.S. patent application Ser. No. 14/489,183, filed Sep. 17, 2014, now issued U.S. Pat. No. 9,569,238, which is a continuation of U.S. patent application Ser. No. 13/116,657, filed May 26, 2011, now issued U.S. Pat. No. 8,863,119, which claims the benefit of U.S. Provisional Patent Application No. 61/349,135, filed May 27, 2010, and the entire contents of each are incorporated herein by reference.

TECHNICAL FIELD

Embodiments of the subject matter described herein relate generally to database systems, and more particularly, to methods and systems that support use of dynamic workflows for use with validation or formulas in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Business processes span every department in every industry. They define the best practices of a company. In most companies, processes are manual. They are defined and enforced with, for example, spreadsheets, email, and word of mouth. The result is inconsistent execution, lost opportunities, and higher operating costs.

Increasingly, business processes can be performed using software. Modern software development is evolving toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups from a common data storage element. The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users. For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like).

In practice, the different tenants often have different types of data and/or different relationships between data that they would like to maintain in the multi-tenant system, along with different types of operations they would like to be able to perform on their data to achieve different business objectives. Accordingly, some multi-tenant systems include an application platform that supports a customizable user experience, for example, to create custom applications, web pages, reports, tables, functions, and/or other objects or features. However, creating customizations can be difficult and time-consuming for users who are relatively inexperienced with computer programming or are otherwise unfamiliar with the platform(s) of the multi-tenant system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
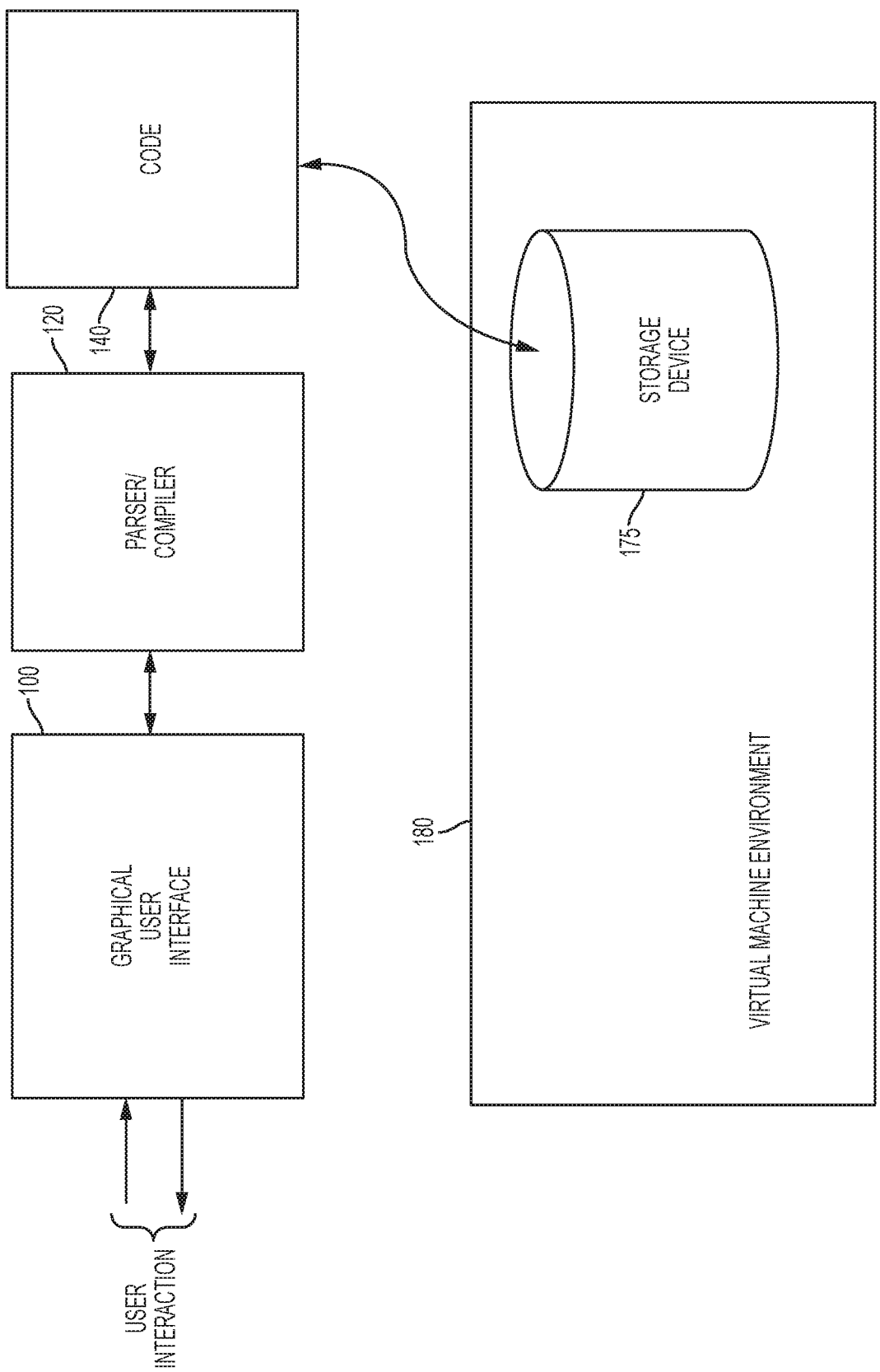
FIG. 1 is a conceptual diagram of a mechanism to allow a user to develop and/or modify a process and implement the process without restarting or rebooting of a virtual machine or host system.

In the following description, numerous specific details are set forth. However, embodiments of the invention may be practiced without these specific details. In other instances, well-known circuits, structures and techniques have not been shown in detail in order not to obscure the understanding of this description.

Systems and methods are provided herein for providing dynamic workflow management in a multi-tenant database system. As used herein, a multi-tenant database system refers to those systems in which various elements of hardware and software of the database system may be shared by one or more customers. For example, a given application server may simultaneously process requests for a great number of customers, and a given database table may store rows for a potentially much greater number of customers.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

Cloud computing and/or multitenant environments make a new class of applications possible. To help get the most from these process-aware applications, a visual process manager may be provided. This design tool lets a user visually draw process flows or decision trees, and automatically build these processes into a corresponding application. In one embodiment, these applications can then be run by applications in a cloud computing or multitenant environment.

In one embodiment, the visual process manager may function like having a navigation system inside an application to help users make better and faster decisions. Applications may become more useful when users are provided with recommendations, wizards, and automated tasks. Previously, applications began with someone drawing out the business process. The process then gets hardcoded into the application and cannot be easily changed as the business grows and adapts to the marketplace.

Yet processes change on a monthly, weekly, and even daily basis. As a cloud-based process management solution, the visual process manager combines the speed and ease of the cloud with graphical process design to create a solution designed for continual process iteration. In one embodiment, designing and changing business processes may be done in a drag-and-drop designer. It may be accomplished in as little as four steps:

Step 1: Visual process designer—A user may design the processes with an intuitive user interface. For example, draw from a library of process tools, including presentation components (e.g., forms, questions, choices, and more) and logic components (e.g., task assignments, decision trees, and approval processes). The user may add components to a visual process design diagram through, for example, drag-and-drop actions. The development environment may provide wizards to the user interface so that a user may build an application with no programming. In one embodiment, wizards can guide users through a process by deciding which pages to display next based on user input.

Step 2: Process simulator—The user and/or the development environment may function to optimize the process design by simulating processes before deploying them. This simulation may identify bottlenecks and conflicts, and iterate the process as needed.

Step 3: Real-time process engine—When an application is ready, the development environment may deploy it to the cloud or multitenant environment. In one embodiment, the real-time process engine automatically scales the application to fit the needs of a tenant based on, for example, size. The run-time engine may ensure the process is run consistently without fail, including security measures, process decisions, callouts, and automated actions, etc.

Once the application(s) is/are ready the files associated with the application(s) can be stored in the cloud or multi-tenant environment. In one embodiment, these files are archive files that include multiple class files that loaded and executed in running the application(s). As described in greater detail below, these archive files may be discovered via an automated mechanism that scans files of a host system to find archive files.

Classes included in the archive files may be copied to a class path so that the environment in which the applications are executed may access the classes. In one embodiment, the classes may be registered without need of rebooting or otherwise restarting the host system or the virtual machine environment in which the applications may run.

FIG. 1 is a conceptual diagram of a mechanism to allow a user to develop and/or modify a process and implement the process without restarting or rebooting of a virtual machine or host system. In one embodiment, the user may utilize a client computer device to develop the process that may be uploaded to and/or executed by a multitenant environment. Example embodiments of client devices coupled with multitenant environments are described in greater detail below.

A user may interact with graphical user interface 100 to design a process (e.g., a business process, a work flow, a sales flow) that may be implemented in virtual machine environment 180. In one embodiment, the user may interact with graphical user interface 100 to use graphical representations of process steps or elements that may be manipulated via user interactions with graphical user interface 100 to construct a process to be implemented in virtual machine environment 180.

The process constructed via graphical user interface 100 may be parsed and/or compiled by parser/compiler 120. Parser/compiler 120 may function to convert the graphical representation of the process to be implemented to code 140 that may be executed in virtual machine environment 180. In one embodiment, parser/compiler 120 deserializes the process and stores the result in a database. In one embodiment, parser/compiler 120 does not convert the process to bytecode to be executed.

In one embodiment, a state machine utilizes metadata from the process to construct and execute the process. Metadata refers to a process description that is not compiled, but is converted from a description to an object model that is utilized by the state machine.

In one embodiment, parser/compiler 120 may provide analysis and/or debugging functionality to assist the user in determining whether the process designed using graphical user interface 100 will provide the desired functionality. In one embodiment, parser/compiler 120 operates on a preselected set of entry points or "hooks" that may be utilized to integrate code 140 into existing code that may be executed in virtual machine environment 180.

Figure 2:
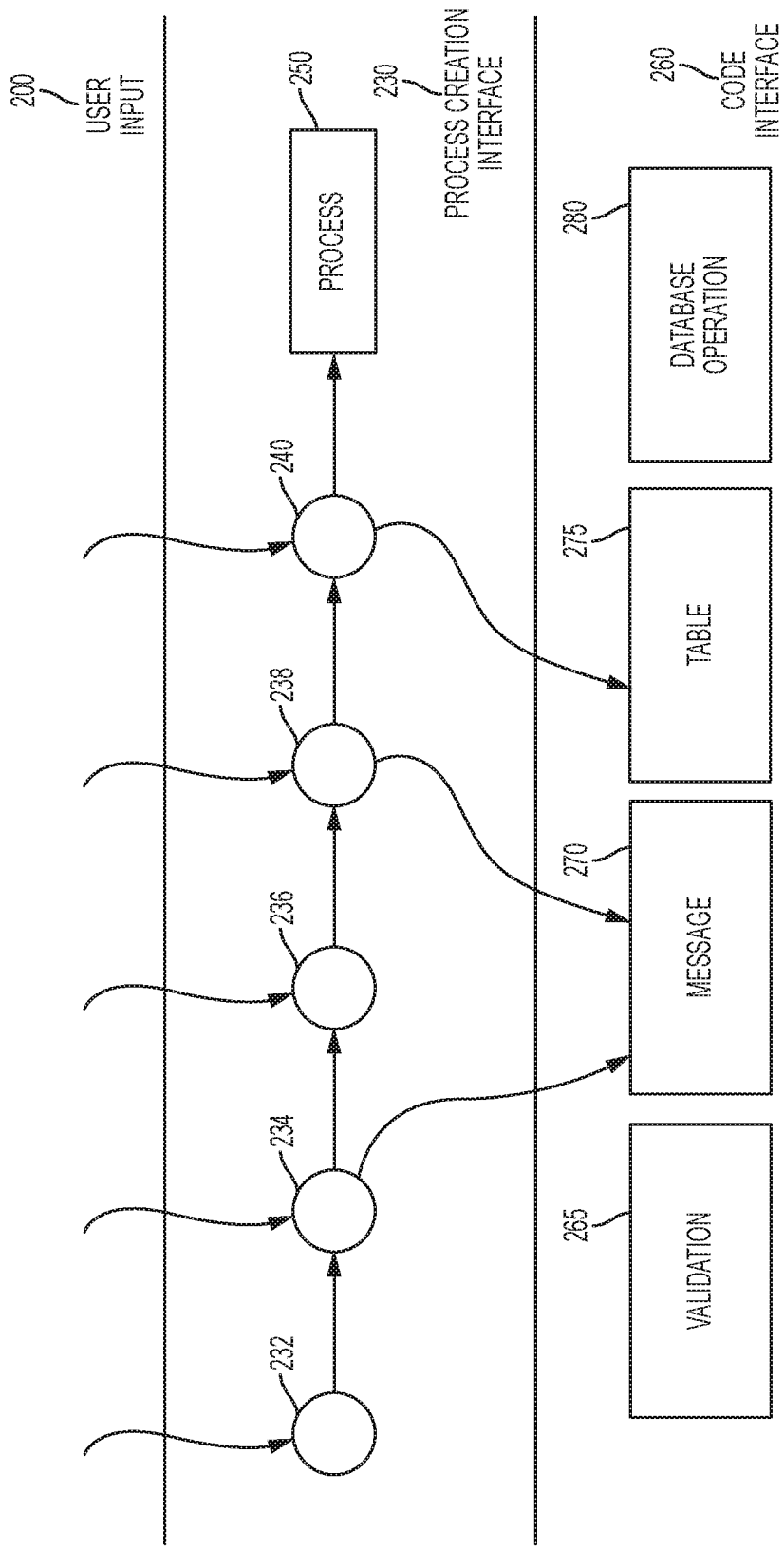
FIG. 2 is a conceptual illustration of a workflow for generating a process without restarting or rebooting of a virtual machine or host system.

Once code 140 is created, it may be stored on storage device 175 that may be accessible by virtual machine environment 180. In one embodiment, storage device 175 represents a physical storage medium that is part of a host system (not illustrated in FIG. 1) upon which virtual machine environment 180 exists. Virtual machine environment 180 may access all or a portion of storage device 175 during execution to provide a virtual machine experience to a user thereof FIG. 2 is a conceptual illustration of a workflow for generating a process without restarting or rebooting of a virtual machine or host system. The illustration of FIG. 2 provides a conceptual illustration of an interaction between user interface objects that may be used to create a process and one or more corresponding code entry points.

User input 200 may be received by process creation interface 230 to assemble one or more process nodes (e.g., 232, 234, 236, 238, 240) to construct a process 250. The nodes may represent pre-defined operations or responses that the user desires to be included in the process being constructed. One or more of the nodes may include calls to lower level code blocks (e.g., 265, 270, 275, 280) that may provide access to certain types of operations associated with the code blocks.

For example, node 234 may include an operation that uses a message that may be passed to another entity. In one embodiment, node 234 includes a call to message code 270 to provide an entry into messaging operations supported by the virtual machine interface in which the process will operate. Similarly, node 238 may use a different kind of message, but still include a call to message code 270 to implement the message functionality of node 238.

As another example, node 240 may include a call to table code 275, which may provide the functionality to create a table based on input from node 240. The example of FIG. 2 provides code blocks for validation, messaging, tables and database operations. In alternate embodiments, additional and/or different code entry points may be supported. In one embodiment, when the interface components are parsed and/or compiled, calls to the code blocks and/or portions of the code blocks may be included in the resulting compiled code. This may provide a more standardized code interface 260 that may support the integration procedures described below as well as result in a reduced likelihood of errors.

Figure 3:
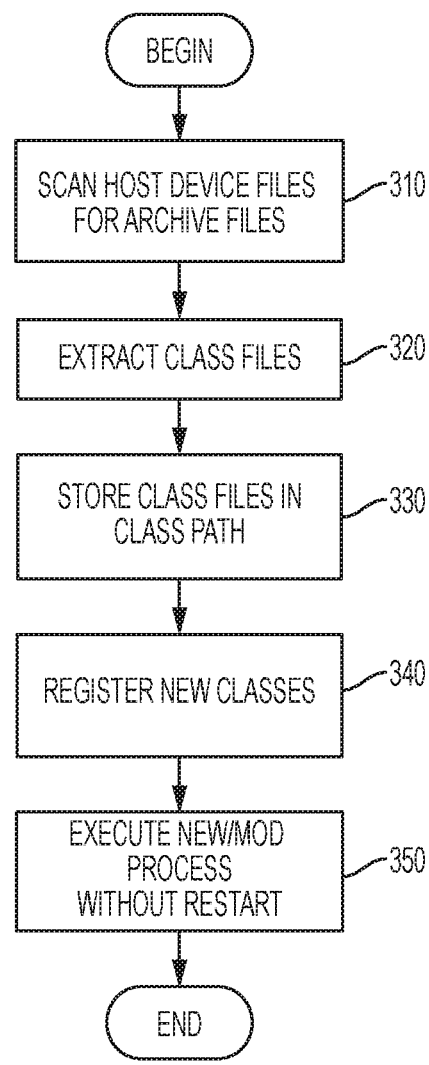
FIG. 3 is a flow diagram of one embodiment of a technique for integrating new code into a running virtual machine environment.

FIG. 3 is a flow diagram of one embodiment of a technique for integrating new code into a running virtual machine environment. The functionality described with respect to FIG. 3 may be provided by a user/client computer system, by a server system providing at least a portion of a multitenant or cloud environment, or some combination thereof All or a portion of the file system of the host computer system is scanned for archive files or other files including classes to be used by a process (created as described above) or other functionality, 310. In one embodiment, the scanning is triggered by a call to a class or function that is not registered. In another embodiment, the scanning is triggered by a user-generated request. In yet another embodiment, the scanning may be triggered by a timer function (e.g., scan every 60 minutes, 4 times a day, every 30 minutes). Combinations of these triggering events may also be supported.

In one embodiment, an agent or other component on the host system analyzing file directories of the host system to find files that may include classes that have not been registered accomplishes scanning. In one embodiment, the agent scans the file directories for archive files (e.g., .jar files for JAVA®) or class files (e.g., .class files for JAVA®).

The identified class files are extracted, 320, if necessary. If a file includes only a single class, then no extraction may be necessary. If a file includes multiple classes, the multiple classes may be extracted and, for example, stored as individual files, or links/pointers to the individual classes.

The identified classes are stored on the class path, 330. Storing the classes on the class path allows the virtual machine environment to determine what classes are supported. The new classes may be registered, 340, without requiring a restart of the virtual machine environment 350.

Figure 4:
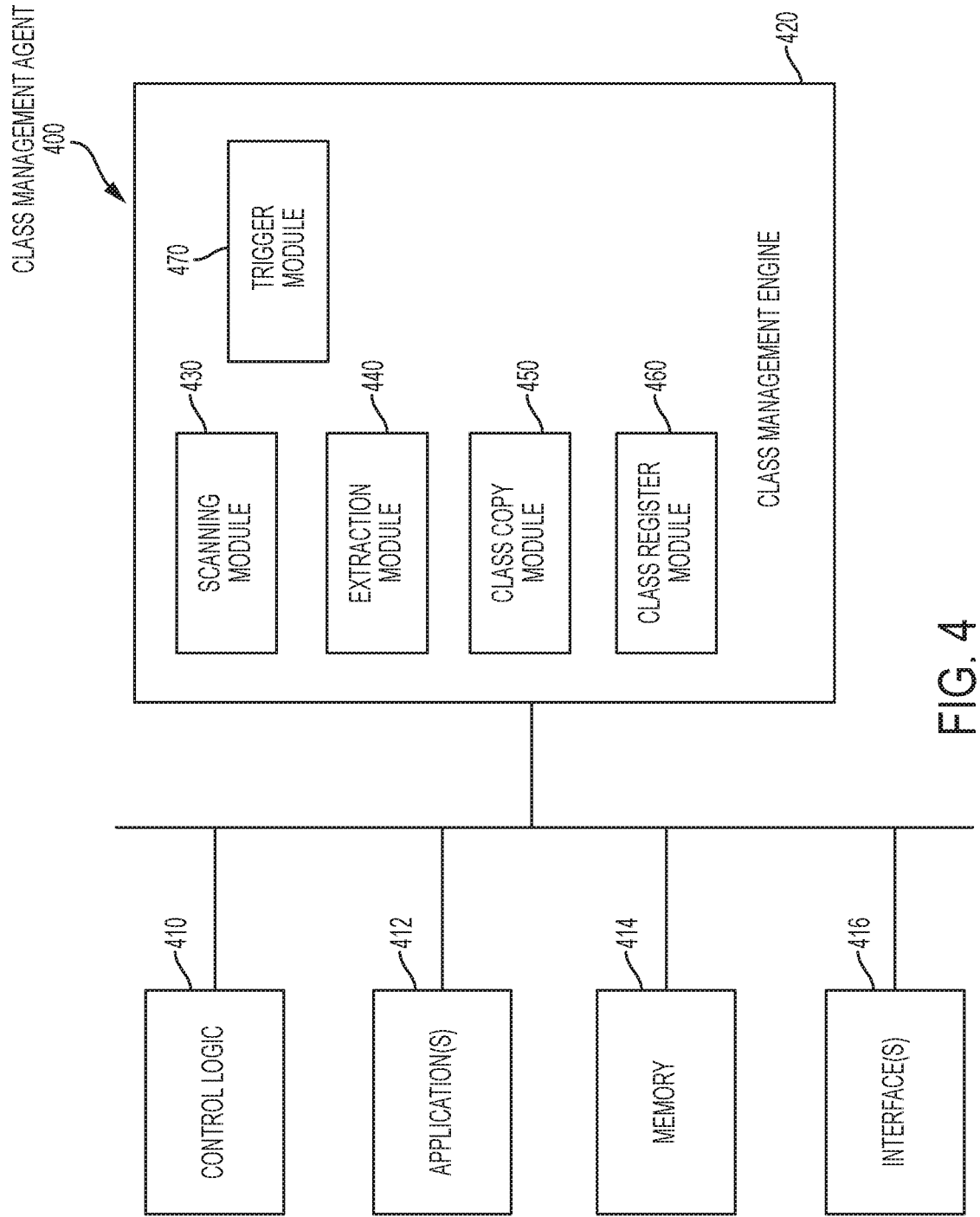
FIG. 4 is a block diagram of one embodiment of an agent to provide integration of new code into a running virtual machine environment.

FIG. 4 is a block diagram of one embodiment of an agent to provide integration of new code into a running virtual machine environment. The agent of FIG. 4 may provide the functionality discussed above with respect to FIG. 3. The agent may exist, for example, within a virtual machine that may be part of a multitenant environment. As another example, the agent may be part of an application running on a server computing platform.

Class management agent 400 includes control logic 410, which implements logical functional control to direct operation of class management agent 400, and/or hardware associated with directing operation of class management agent 400. Logic may be hardware logic circuits and/or software routines. In one embodiment, class management agent 400 includes one or more applications 412, which represent code sequence and/or programs that provide instructions to control logic 410.

Class management agent 400 includes memory 414, which represents a memory device and/or access to a memory resource for storing data and/or instructions. Memory 414 may include memory local to class management agent 400, as well as, or alternatively, including memory of the host system on which class management agent 400 resides. Class management agent 400 also includes one or more interfaces 416, which represent access interfaces to/from (an input/output interface) class management agent 400 with regard to entities (electronic or human) external to class management agent 400.

Class management agent 400 also includes class management engine 420, which represents one or more functions or module that enable class management agent 400 to provide the indexing services as described above. The example of FIG. 4 provides several modules that may be included in class management engine 420; however, different and/or additional modules may also be included. Example modules that may be involved in providing the class management functionality include scanning module 430, extraction module 440, class copy module 450, class register module, and trigger module 470. Each of these modules may further include other sub-modules to provide other functions. As used herein, a module refers to routine, a subsystem, logic circuit, microcode, etc., whether implemented in hardware, software, firmware or some combination thereof Scanning module 430 operates to scan the host system for files that may include one or more classes. In one embodiment, scanning module 430 may scan the contents of files located on the host system for classes. Scanning module 430 may, for example, search for tags or other character strings that indicate a class definition. Other techniques for identifying classes may also be used. Scanning module 430 may provide an identification of, or link or path to, one or more files including one or more classes to other modules in class management agent 400.

Extraction module 440 operates to extract classes from files that include the classes. In one embodiment, extraction module 440 operates in information provided by scanning module 430 to locate files including classes. Extraction module 440 extracts one or more classes from the files. Class copy module 450 operates to copy the classes to the class path, or other location, where the classes may be registered. Class copy module 450 may operate with extraction module 440 to copy the classes.

Class register module 460 operates to register the classes with the host system and/or virtual machine. In one embodiment, class register module 460 scans the class path to determine whether any classes on the class path have not been registered, and registers the classes. Class register module 460 causes the classes to be registered without requiring that the host system and/or virtual machine to be restarted.

Trigger module 470 operates to trigger the scanning and registration process discussed above. In one embodiment, trigger module 470 operates as a timer to trigger scanning and/or registration upon the expiration of specified time intervals. In another embodiment, trigger module 470 operates to trigger scanning and/or registration upon detecting specified conditions, for example, a call to a class that has not been registered. Other conditions may also be supported.

Figure 5:
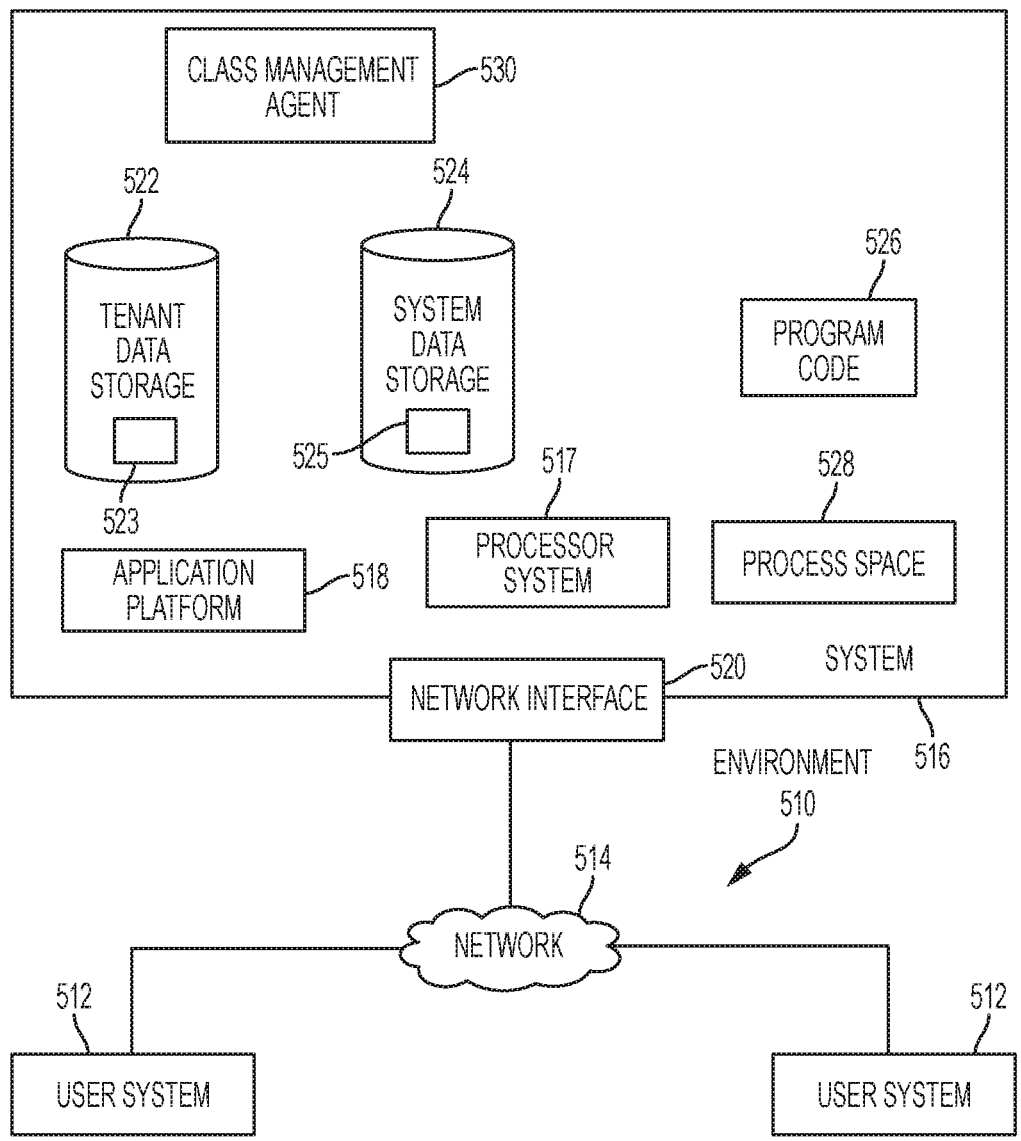
FIG. 5 is a block diagram of an environment in which an on-demand database service might be used.

FIG. 5 is a block diagram of an environment in which an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

In one embodiment, environment 510 is an environment in which an on-demand database service exists. In another embodiment, environment 510 is a cloud computing environment that provides services to multiple users. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein.

A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. Indexer(s) may include one or more indexers that operate as described herein with the indexes created by indexer(s) being backed up as described herein.

One arrangement for elements of system 516 is shown in FIG. 5, including network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service.

In one embodiment, class management agent 530 resides in system 516. In one embodiment, class management agent 530 may provide some or all of the functionality of the agent described above, for example, the agent of FIG. 4. In another embodiment, class management agent 530 may reside on multiple systems and/or user devices.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers.

The user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a processing unit such as processor system 517, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 516 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
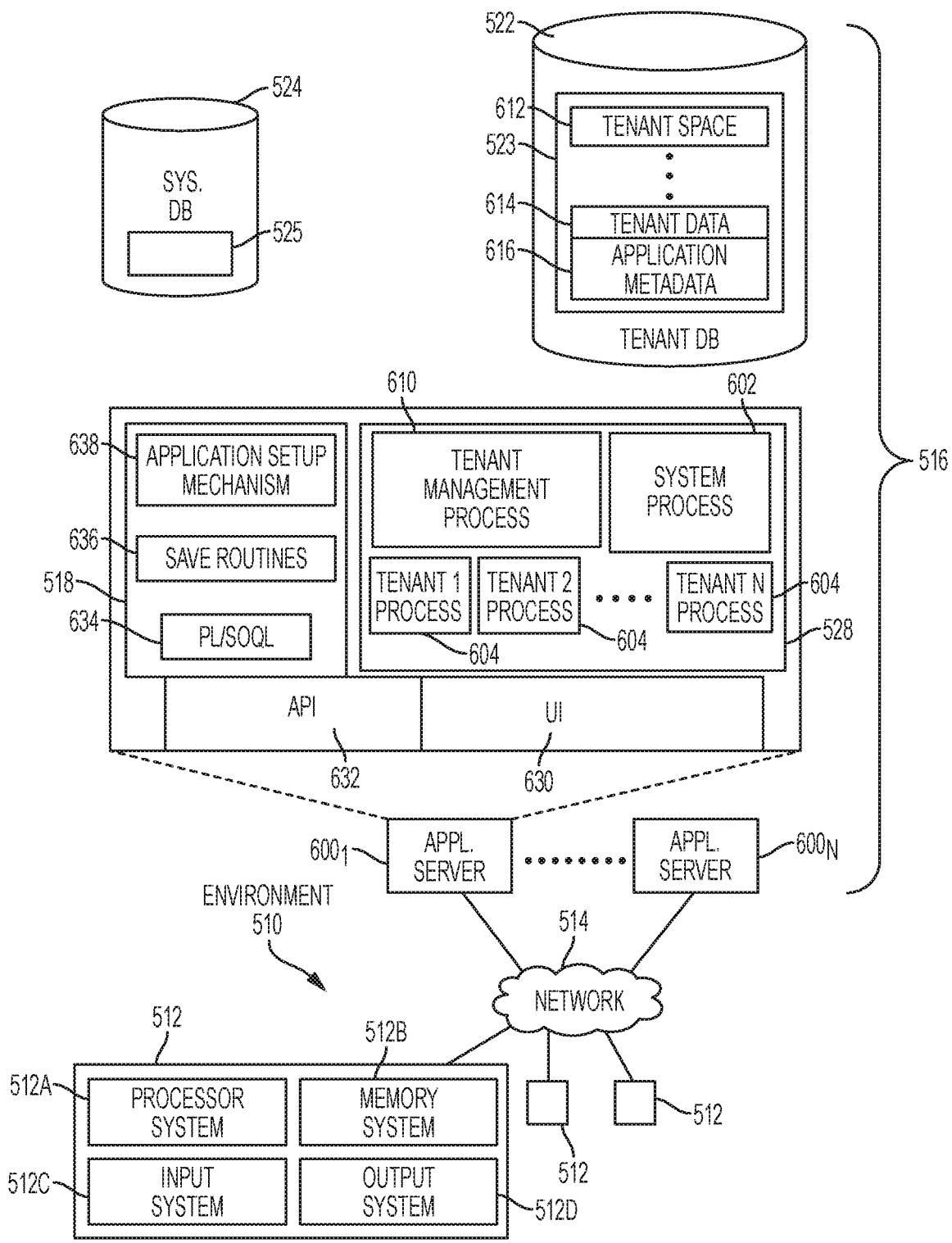
FIG. 6 is a block diagram of one embodiment of a multi-tenant environment.

In FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers 600₁-600_N, system process space 602, tenant process spaces 604, tenant management process space 610, tenant storage space 612, tenant data 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage spaces 612, which can be either a physical arrangement and/or a logical arrangement of data.

Within each tenant storage space 612, tenant data 614 and application metadata 616 might be similarly allocated for each user. For example, a copy of a user's most recently used (MRU) items might be stored to tenant data 614. Similarly, a copy of MRU items for an entire organization that is a tenant might be stored to tenant storage space 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610, for example. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there may no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600.

In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema.

Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7:
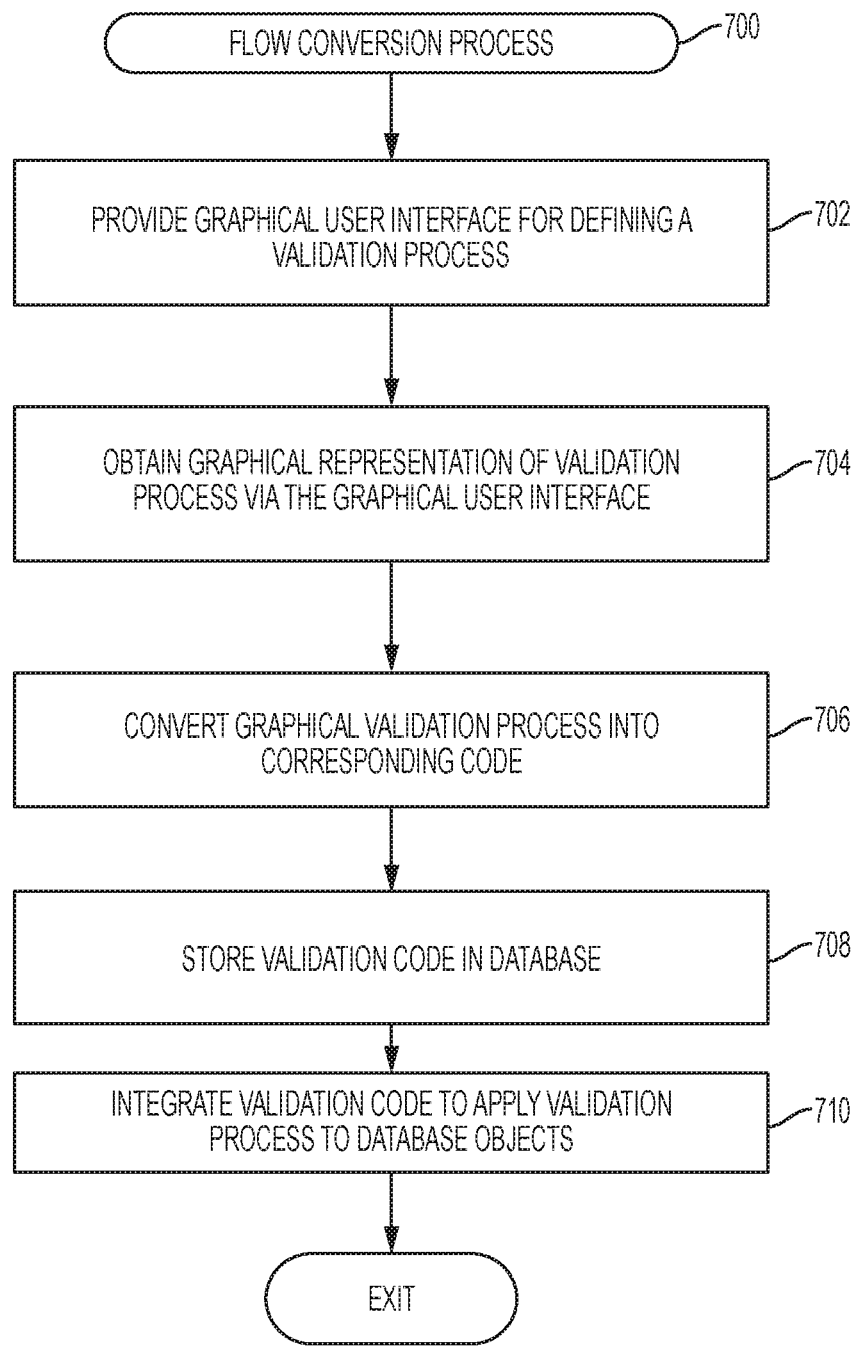
FIG. 7 is a flow diagram of an exemplary flow conversion process in accordance with one or more exemplary embodiments.
Figure 8:
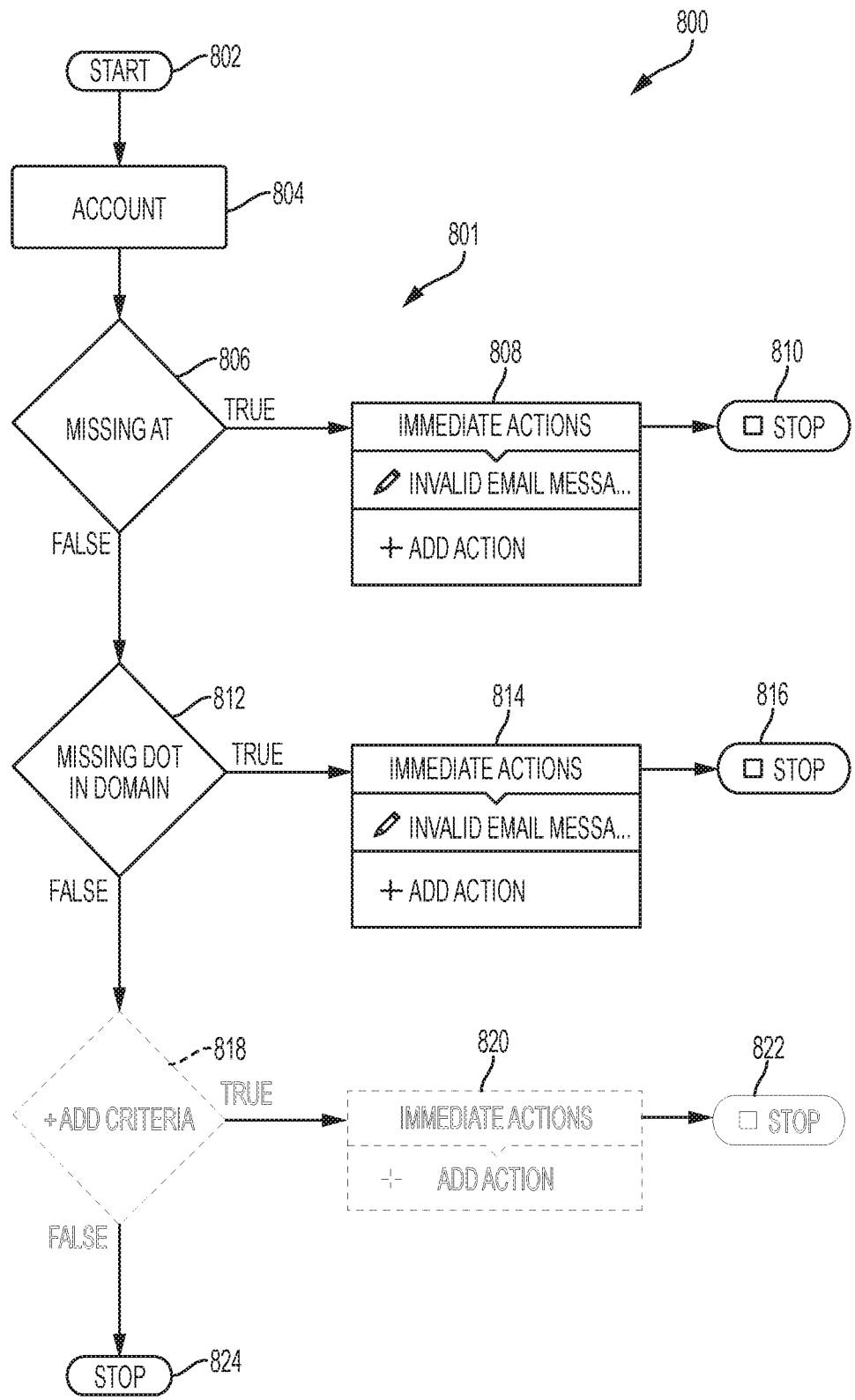
FIG. 8 depicts an exemplary visual process builder graphical user interface (GUI) display that may be presented in connection with the flow conversion process of FIG. 7 in accordance with one or more exemplary embodiments.

Referring now to FIGS. 7-8, in one or more exemplary embodiments, a visual process designer is configured to allow a user to create or otherwise design a validation process to be associated with a particular type of database object, such as a custom object type associated with that particular user or tenant. In this regard, a user may draw from a library of process tools and add components to a visual process design diagram through, for example, drag-and-drop actions, to define the events or triggers on which a validation process is to be performed with respect to an instance of the custom object, along with the validation criteria to be applied to fields of that custom object and the resultant pages to display or other user notifications to provide as a result of the validation process. In a similar manner as described above, the user may utilize a client computing device to develop the validation process that may be uploaded to and/or executed by a multitenant environment within a graphical user interface (GUI) display provided on the client device associated with a virtual application provided by an application server. The user interacts with the process builder GUI display to use manipulable graphical representations of process steps or elements to construct a validation process to be implemented in virtual machine environment. The user may also define the events or triggers for the validation process, the type of database object to which the validation process is to be applied, the fields of the database object to be validated and the validation criteria associated therewith, along with any notifications or GUI displays or elements to be generated as a result of the validation process.

In a similar manner as described above, the validation process is parsed and converted from the graphical representation into code (e.g., process code 140, 250). The validation process code is then stored in the multi-tenant database or other storage device that may be accessible by the virtual machine environment, for example, as validation code 265, which, in turn, may also be integrated into other processes, as described above. In one embodiment, the validation process is maintained using an object model representing the structure of the validation process, where an engine of a database system interprets and executes the validation process based on that model.

FIG. 7 depicts an exemplary embodiment of a flow conversion process 700 suitable for implementation by a database system supporting a virtual machine environment, such as system 516, to support or otherwise enable a validation process designed by a user using a visual process designer GUI display provided by the database system. For illustrative purposes, the following description may refer to elements mentioned above in connection with FIGS. 1-6. In this regard, while portions of the flow conversion process 700 may be performed by different elements of a database system, for purposes of explanation, the subject matter may be described herein in the context of the flow conversion process 700 being primarily performed by an application server 600 and/or the application platform 518. It should be appreciated that the flow conversion process 700 may include any number of additional or alternative tasks, the tasks need not be performed in the illustrated order and/or the tasks may be performed concurrently, and/or the flow conversion process 700 may be incorporated into a more comprehensive procedure or process having additional functionality not described in detail herein. Moreover, one or more of the tasks shown and described in the context of FIG. 7 could be omitted from a practical embodiment of the flow conversion process 700 as long as the intended overall functionality remains intact.

The illustrated embodiment of the flow conversion process 700 initializes or otherwise begins by generating or otherwise providing a GUI display including a library of components that are manipulable or otherwise configurable to define a validation process (task 702). In exemplary embodiments, the GUI display provided on a client device (e.g., user system 512) includes a library of visual components, such as icons, tiles, or other GUI elements or objects, which are selectable or otherwise manipulable by the user. The GUI display also includes a design region, where library components are added by the user (e.g., by drag and drop, keyboard entries, or the like) and suitably interconnected (e.g., using arrows) to define a process flow. In this regard, each library component may have corresponding logic, functionality, or other processing associated therewith, with the arrows providing interrelationships and/or sequencing for building a comprehensive logic flow corresponding to the visually designed process.

In exemplary embodiments, one or more library components correspond to flowchart symbology, such as, for example, a start, stop, or other endpoint symbol (e.g., an oval), a decision symbol (e.g., a diamond), a process symbol (e.g., a rectangle), an input/output (I/O) symbol (e.g., a parallelogram), one or more relational symbols (e.g., an arrow), and the like. In this regard, a flowchart symbol may be associated with a particular type of flowchart functionality, with the symbology being editable by the user to define the functionality associated with that particular instance of the flowchart symbol in the context of the database system 516 and the process flow being designed. For example, a user may manipulate a decision symbol added to the design region to define the decision logic to be associated with that particular decision symbol within the context of the process flow being designed and with reference to fields, objects, or other data maintained by the database system 516. In this regard, the user may select or otherwise identifies the type of database object to which a validation process flow should apply, the type of event upon which the validation process flow is performed, the various fields of an instance of that database object type that are to be analyzed, and the validation criteria to be applied to those fields.

Still referring to FIG. 7, the flow conversion process 700 continues by receiving or otherwise obtaining a graphical representation of a validation process flow defined by a user via the GUI display, converting the graphical validation process flow into corresponding code, and storing or otherwise maintaining the validation process flow code at the database system (tasks 704, 706, 708). For example, once a user has defined the logic of the validation process flow being designed, the user may select or otherwise manipulate a button or similar GUI element to create, enable, or otherwise instantiate the validation process flow within the database system 516. In one embodiment, the validation process flow is provided to a parser/compiler 120 which converts the visual validation process flow into corresponding validation process code 140, 250 to be stored by the database system 516.

In one or more embodiments, the flow conversion process 700 integrates or otherwise links the validation process flow code into existing code (task 710). Thereafter, the validation process code is utilized to apply or otherwise perform the visual validation process flow designed via the graphical interface 100 in response to subsequent database actions that trigger, hook, or otherwise invoke the validation process code. In one embodiment, a hook is an abstract method called from some central logic, where for the validation code, one or more hooks invoke the validation code and thereby perform the validation process when a record is saved. In this regard, the hook may locate validation rule formulas associated with the edited field(s) and execute those, while also looking for any validation process flows associated with the record and execute those as well. In such embodiments, validation rules may be implemented on a per field level or associated with a particular field of an object, whereas validation process flows implemented at the object level or are associated with a particular object. Thus, validation process flows can be designed via a visual process designer GUI to effectuate multiple validation rules or achieve complex validations that apply to or are dependent on multiple different field values.

FIG. 8 depicts an exemplary embodiment of a visual validation process flow defined using a visual process designer GUI display 800 provided by an application server 600 and/or application platform 518 on a client device (e.g., user system 512) in connection with one or more exemplary embodiments of the flow conversion process 700. To create the depicted visual validation process flow, the user of the client device may drag and drop or otherwise add a start symbol 802 to the design region 801, drag and drop or otherwise add a process symbol 804 to the design region 801, and then manipulate the process symbol 804 to define the type of database object (e.g., account objects) to which the validation process flow applies. Additionally, in some embodiments, the process symbol 804 may be manipulated or modified to further delimit or define the criteria for triggering or invoking the validation process flow, for example, to limit the execution of the validation process flow to a particular type of database action (e.g., object creation, object modification, or the like).

A user may then drag and drop or otherwise add a decision symbol 806 following the process symbol 804 (e.g. via an arrow) to the design region 801, and then manipulate the decision symbol 806 to define validation criteria to be applied to an instance of a database object being validated. In this regard, the user may define the field of the database object to be analyzed, along with the validating criteria for the values of that field of the database object. For example, in the illustrated embodiment, the user configures the decision symbol 806 to verify or otherwise validate whether the value of an email address field of an account database object includes an at sign (@). If the decision symbol 806 returns a value indicating the email address field is missing the at sign, the user modifies an action process symbol 808 to define one or more actions to be performed by the database system 516 before exiting or terminating the validation process at end symbol 810. In the illustrated embodiment, the user configures the action symbol 808 to provide a notification indicative of an invalid email message.

The user may similarly add another decision symbol 812 to continue the validation process when the decision symbol 806 returns a value indicating the email address field is not missing the at sign. In the illustrated embodiment, the user configures the decision symbol 812 to verify or otherwise validate whether the value of the email address field of the account database object includes a period delimiter within the domain name (e.g., the portion of the email address field value following the at sign). If the decision symbol 812 returns a value indicating the email address field is missing the domain delimiter, the user modifies an action process symbol 814 to provide an invalid domain name message before exiting or terminating the validation process at end symbol 816.

The user may continue to add symbology to the design region 801 to further define the validation process flow as desired. In the illustrated embodiment, the design region 801 of the visual process designer GUI display 800 is automatically populated with temporary or inactive decision symbology 818 and corresponding action and exit symbology 820, 822 that may be activated and added to the validation process flow in response to a user manipulating or otherwise configuring the symbology 818, 820. Thus, the visual process designer GUI display 800 may obviate the need for the user to drag and drop or otherwise manually add additional decision trees to the validation process, thereby facilitating expedient design of the validation process flow. The inactive symbology 818, 820 may be rendered or otherwise displayed using a visually distinguishable characteristic (e.g., fading, highlighting, or the like) to visually indicate, to the user, the nature of the symbology 818, 820 as being inactive or otherwise requiring configuration for implementation. In the absence of the user manipulating or otherwise configuring the inactive symbology 818, 820, the inactive or non-configured symbology 818, 820 may be automatically excluded or otherwise removed from the validation process flow before compilation, to effectuate the validation process flow terminating at end symbol 824 following the last of the displayed symbology 812 that has been configured by the user.

Once the user finishes designing a validation process in the design region 801, the user may select or otherwise manipulate a button or similar GUI element presented on the client device to submit, save, or otherwise store the validation process and enable the validation process in the database system 516. In response, the application server 600 and/or application platform 518 receives or otherwise obtains the graphical representation of the validation process defined within the visual process designer GUI display 800, converts the configured symbology 804, 806, 808, 812, 814 into corresponding source code segments or logic, arranges the source code segments to have the sequential or logical relationships indicated by the arrows, and then parses and compiles the source code description of the graphical representation of the validation process into object model code representative of the validation process workflow. The application server 600 and/or application platform 518 then stores or otherwise maintains the object model code for the validation process within the data storage 175 of the database system 516 and integrates the validation process code into the program code 526 (e.g., by using one or more hooks). Thereafter, upon the user or affiliates (e.g., other users having a common tenant, organization, workgroup, or the like) creating or modifying account database objects associated with the user (or the user's tenant, organization, workgroup, or the like), the visual validation process defined by the user via the visual process designer GUI display 800 is invoked by the database system 516 to verify or otherwise validate that the email addresses associated with those accounts include the at sign and a period domain delimiter before storing, saving, or otherwise persisting that email address field value for the account within the database system 516.

The visual process designer GUI display and flow conversion process can allow a relatively unsophisticated user in terms of computer programming syntax or code development to create complex validation processes within the database system virtual machine environment. In this regard, the visually-designed validation process could incorporate any number of user-configurable triggers for the validation process and/or user-configurable notifications or responses generated by the validation process based on object field values. Thus, the validation code may be configured within the database system to performed only when that triggering criterion is satisfied (e.g., by using the triggering criterion when integrating the validation code with existing process code that may be executed in virtual machine environment), and/or user-defined notifications or responses may be generated based on the value(s) of one or more fields of the instance of a database object type failing to satisfy user-specified validation criteria. Additionally, the validation process can be configured by the user to apply to custom database object types and/or custom fields thereof. Thus, users can create complex user-configured validation processes for custom objects with customized triggers and notifications without performing any coding.

Figure 9:
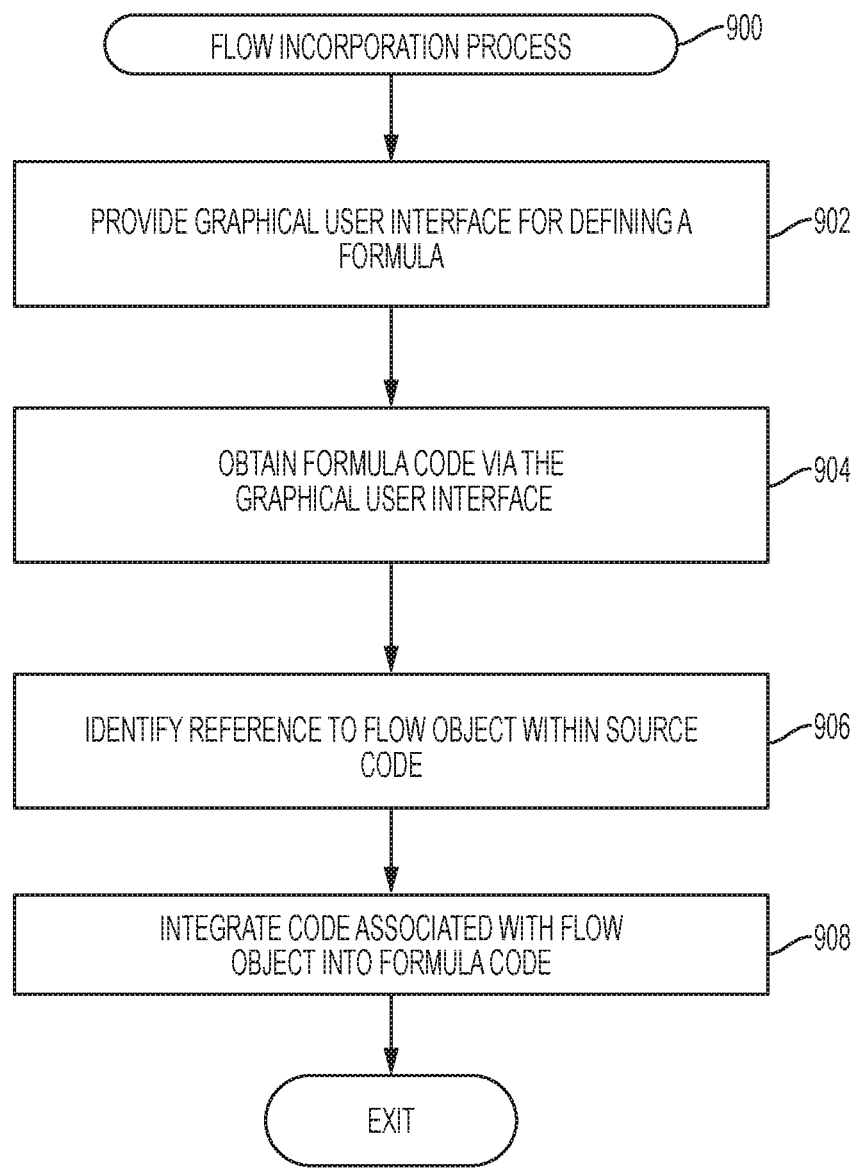
FIG. 9 is a flow diagram of an exemplary flow incorporation process in accordance with one or more exemplary embodiments.
Figure 10:
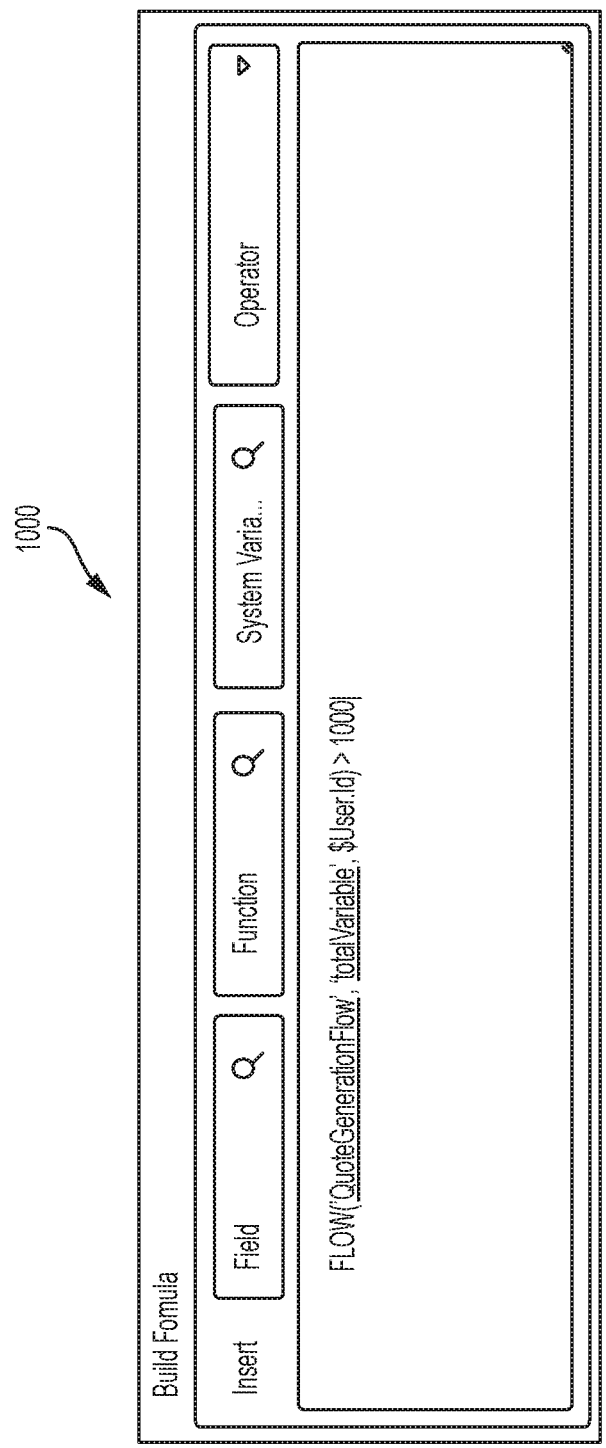
FIG. 10 depicts an exemplary formula editor GUI display that may be presented in connection with the flow invocation process of FIG. 9 in accordance with one or more exemplary embodiments.

Referring now to FIGS. 9-10, in accordance with one or more embodiments, a process graphically defined using a visual process builder GUI display is stored or otherwise maintained within a database system as a formula object that encapsulates the process functionality and allows for the functionality to be invoked or otherwise introduced into a formula by specifying or otherwise calling the flow object within a formula editor. For example, in accordance with one or more embodiments, a user may input or otherwise provide a name to be associated with a graphically defined process, thereby allowing the functionality associated with the process to be invoked by calling the process by name within a formula.

In one or more embodiments, a table of flow database objects is stored or otherwise maintained in a database of a database system. A row or entry corresponding to a flow object in the flow database object table maintains an association between the name of a particular flow, the object model code or logic corresponding to the flow, and one or more identifiers indicating the user that created or defined the flow, the tenant or organization associated with the user, and/or other information that indicates the subset of users to which the flow is available for usage. Additionally, the row or entry corresponding to a flow object may include or otherwise be associated with information identifying the number and type of inputs and/or outputs associated with the flow.

As described in greater detail below, a server of the database system receives or otherwise obtains formula source code from a client device and identifies the reference to the process code stored in a database based on the flow object being called within the formula source code. The server retrieves the corresponding process code from the database and then compiles the formula source code by including or otherwise inserting the process object model code at the location within the formula source code where the flow object is called. This results in a compiled version of the formula source code that integrates the process object model code via the flow function call. Thus, rather than a user having to re-code an existing process flow in the formula editor, the existing process can be incorporated by reference via the flow formula database object and function call. The resulting compiled formula code can then be stored or otherwise maintained in the database for integrating the formula into the database system.

FIG. 9 depicts an exemplary embodiment of a flow incorporation process 900 suitable for implementation by a database system supporting a virtual machine environment, such as system 516, to support or otherwise enable incorporation of a process into a formula by a user using a formula editor GUI display provided by the database system. For illustrative purposes, the following description may refer to elements mentioned above in connection with FIGS. 1-6. In this regard, while portions of the flow incorporation process 900 may be performed by different elements of a database system, for purposes of explanation, the subject matter may be described herein in the context of the flow incorporation process 900 being primarily performed by an application server 600 and/or the application platform 518. It should be appreciated that the flow incorporation process 900 may include any number of additional or alternative tasks, the tasks need not be performed in the illustrated order and/or the tasks may be performed concurrently, and/or the flow incorporation process 900 may be incorporated into a more comprehensive procedure or process having additional functionality not described in detail herein. Moreover, one or more of the tasks shown and described in the context of FIG. 9 could be omitted from a practical embodiment of the flow incorporation process 900 as long as the intended overall functionality remains intact.

The illustrated embodiment of the conversion process 900 initializes or otherwise begins by generating or otherwise providing a GUI display that allows a user to create or otherwise define code for a formula to be implemented or otherwise supported by the database (task 902). For example, FIG. 10 depicts an exemplary embodiment of a formula editor GUI display 1000 that may be provided on a client device. In some embodiments, the formula editor GUI display 1000 may be part of an integrated development environment (IDE) provided or otherwise supported by the database system 516. A developer user may utilize the formula editor GUI display 1000 to edit or otherwise modify the source code of a formula to be instantiated or otherwise supported by the database system 516 and then save, upload, or otherwise integrate the defined formula within the database system 516 for that user or affiliated users (e.g., users associated with a particular tenant, organization, or the like).

Referring again to FIG. 9, the flow incorporation process 900 continues by receiving or otherwise obtaining formula code defined by a user via the GUI display, detecting or otherwise identifying a reference to an existing process within the formula code, and integrating code corresponding to the existing process into the formula code at the location of the reference when compiling or otherwise converting the formula code into a form that can be implemented by the database system (tasks 904, 906, 908). In this regard, the parser/compiler 120 is configured to detect or otherwise identify the a flow function call within the formula source code as a reference to an existing process within the database system 516, and then utilizes the parameters passed to the flow function to retrieve and integrate the process code within the formula code. For example, in the illustrated embodiment of FIG. 10, the parser/compiler 120 identifies the FLOW( ) function call as a reference to an existing process, and utilizes the name associated with the process ('QuoteGenerationFlow') to identify and retrieve the corresponding flow object from a flow object table. In this regard, the application server 600 queries a database using the name assigned to the flow object to identify the corresponding entry in the flow object table, and then retrieves the code block or segment associated with that entry. The retrieved process code is then configured by the parser/compiler 120 to be implemented using the inputs and/or outputs specified within the FLOW( ) function call ('totalVariable', and $User.Id) at the location within the formula code where the FLOW( ) function call is made. Thus, the existing process code may effectively be incorporated by reference into a formula without having to re-code the logic corresponding to the process in the context of the variables of the formula. In one or more embodiments, the formula source code is compiled, and the resulting compiled version of the formula code that includes, incorporates, or otherwise references the invoked process object model code is stored or otherwise maintained by the data storage 175 of the database system 516 in a manner that makes the formula available for integration with the program code 526. In one or more embodiments, the formula source code is stored in a string format. If the formula is being used as a query filter, the formula source code is converted into a structured query language and inserted within the query. In other embodiments, an object model and corresponding function for applying the formula object are utilized. In this regard, a flow formula function may receive the inputs to the flow formula and calculate an output according to the formula source code logic.

Referring now to FIG. 9 and with reference to FIGS. 7-8, in one or more embodiments, the flow incorporation process 900 may be utilized to invoke a validation process created in accordance with the flow conversion process 700 of FIG. 7. For example, a flow formula database object may be created corresponding to the validation process depicted in FIG. 8 and assigned a name (e.g., AccountEmailValidationFlow) that may be utilized to refer to the validation process of FIG. 8 within a formula editor GUI display. A user may utilize the formula editor GUI display to invoke the validation process of FIG. 8 by inputting FLOW('AccountEmailValidationFlow', AccountVariable) to perform the validation process on an instance of an account database object, AccountVariable. Upon submission of the formula to the database system 516, an application server 600 and/or application platform 518 identifies the FLOW( ) function call within the formula source code and utilizes the AccountEmailValidationFlow name to obtain the object model code corresponding to the validation process of FIG. 8 from the database. The application server 600 and/or application platform 518 then configure the object model code to operate on the AccountVariable instance at the location within the formula source code where the FLOW( ) call is made. Thus, a user lacking significant coding or development experience or knowledge may utilize the visual process designer GUI display 800 to develop complex validation processes and then subsequently invoke them with a FLOW( ) function call within a formula editor, without having to worry about the syntax or other details of the underlying logic and coding associated with the validation process.

Figure 11:
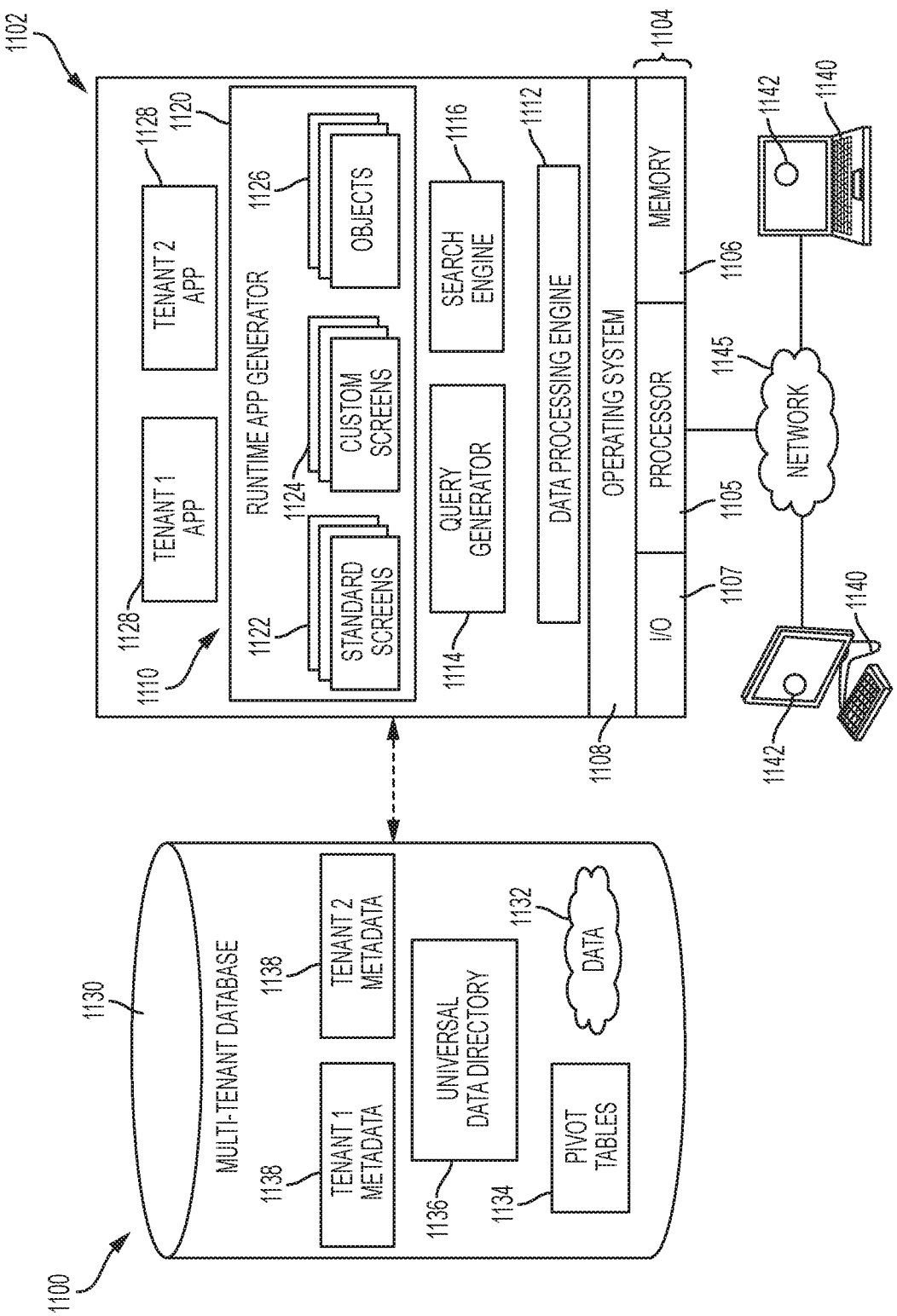
FIG. 11 is a block diagram of an exemplary multi-tenant system suitable for implementing one or more of the flow conversion process of FIG. 7 and the flow invocation process of FIG. 9 in accordance with one or more exemplary embodiments.

FIG. 11 depicts an exemplary embodiment of an on-demand multi-tenant database system 1100 suitable for implementing the flow conversion process 700 of FIG. 7 and/or the flow incorporation process 900 of FIG. 9. The illustrated multi-tenant system 1100 of FIG. 11 includes a server 1102 that dynamically creates and supports virtual applications 1128 based upon data 1132 from a common database 1130 that is shared between multiple tenants, alternatively referred to herein as a multi-tenant database. Data and services generated by the virtual applications 1128 are provided via a network 1145 to any number of client devices 1140, as desired. Each virtual application 1128 is suitably generated at run-time (or on-demand) using a common application platform 1110 that securely provides access to the data 1132 in the database 1130 for each of the various tenants subscribing to the multi-tenant system 1100. In accordance with one non-limiting example, the multi-tenant system 1100 is implemented in the form of an on-demand multi-tenant customer relationship management (CRM) system that can support any number of authenticated users of multiple tenants.

As used herein, a "tenant" should be understood as referring to a group of one or more users that shares access to common subset of the data within the multi-tenant database 1130. In this regard, each tenant includes one or more users associated with, assigned to, or otherwise belonging to that respective tenant. To put it another way, each respective user within the multi-tenant system 1100 is associated with, assigned to, or otherwise belongs to a particular tenant of the plurality of tenants supported by the multi-tenant system 1100. Tenants may represent customers, customer departments, business or legal organizations, and/or any other entities that maintain data for particular sets of users within the multi-tenant system 1100 (i.e., in the multi-tenant database 1130). For example, the application server 1102 may be associated with one or more tenants supported by the multi-tenant system 1100. Although multiple tenants may share access to the server 1102 and the database 1130, the particular data and services provided from the server 1102 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 1132 belonging to or otherwise associated with other tenants.

The multi-tenant database 1130 is any sort of repository or other data storage system capable of storing and managing the data 1132 associated with any number of tenants. The database 1130 may be implemented using any type of conventional database server hardware. In various embodiments, the database 1130 shares processing hardware 1104 with the server 1102. In other embodiments, the database 1130 is implemented using separate physical and/or virtual database server hardware that communicates with the server 1102 to perform the various functions described herein. In an exemplary embodiment, the database 1130 includes a database management system or other equivalent software capable of determining an optimal query plan for retrieving and providing a particular subset of the data 1132 to an instance of virtual application 1128 in response to a query initiated or otherwise provided by a virtual application 1128. The multi-tenant database 1130 may alternatively be referred to herein as an on-demand database, in that the multi-tenant database 1130 provides (or is available to provide) data at run-time to on-demand virtual applications 1128 generated by the application platform 1110.

In practice, the data 1132 may be organized and formatted in any manner to support the application platform 1110. In various embodiments, the data 1132 is suitably organized into a relatively small number of large data tables to maintain a semi-amorphous "heap"-type format. The data 1132 can then be organized as needed for a particular virtual application 1128. In various embodiments, conventional data relationships are established using any number of pivot tables 1134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 1136, for example, can be used to describe any number of forms, reports, workflows, user access privileges, business logic and other constructs that are common to multiple tenants. Tenant-specific formatting, functions and other constructs may be maintained as tenant-specific metadata 1138 for each tenant, as desired. Rather than forcing the data 1132 into an inflexible global structure that is common to all tenants and applications, the database 1130 is organized to be relatively amorphous, with the pivot tables 1134 and the metadata 1138 providing additional structure on an as-needed basis. To that end, the application platform 1110 suitably uses the pivot tables 1134 and/or the metadata 1138 to generate "virtual" components of the virtual applications 1128 to logically obtain, process, and present the relatively amorphous data 1132 from the database 1130.

Still referring to FIG. 11, the server 1102 is implemented using one or more actual and/or virtual computing systems that collectively provide the dynamic application platform 1110 for generating the virtual applications 1128. For example, the server 1102 may be implemented using a cluster of actual and/or virtual servers operating in conjunction with each other, typically in association with conventional network communications, cluster management, load balancing and other features as appropriate. The server 1102 operates with any sort of conventional processing hardware 1104, such as a processor 1105, memory 1106, input/output features 1107 and the like. The input/output features 1107 generally represent the interface(s) to networks (e.g., to the network 1145, or any other local area, wide area or other network), mass storage, display devices, data entry devices and/or the like. The processor 1105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1106 represents any non-transitory short or long term storage or other computer-readable media capable of storing programming instructions for execution on the processor 1105, including any sort of random access memory (RAM), read only memory (ROM), flash memory, magnetic or optical mass storage, and/or the like. The computer-executable programming instructions, when read and executed by the server 1102 and/or processor 1105, cause the server 1102 and/or processor 1105 to create, generate, or otherwise facilitate the application platform 1110 and/or virtual applications 1128 and perform one or more additional tasks, operations, functions, and/or processes described herein. It should be noted that the memory 1106 represents one suitable implementation of such computer-readable media, and alternatively or additionally, the server 1102 could receive and cooperate with external computer-readable media that is realized as a portable or mobile component or application platform, e.g., a portable hard drive, a USB flash drive, an optical disc, or the like.

The application platform 1110 is any sort of software application or other data processing engine that generates the virtual applications 1128 that provide data and/or services to the client devices 1140. In a typical embodiment, the application platform 1110 gains access to processing resources, communications interfaces and other features of the processing hardware 1104 using any sort of conventional or proprietary operating system 1108. The virtual applications 1128 are typically generated at run-time in response to input received from the client devices 1140. For the illustrated embodiment, the application platform 1110 includes a bulk data processing engine 1112, a query generator 1114, a search engine 1116 that provides text indexing and other search functionality, and a runtime application generator 1120. Each of these features may be implemented as a separate process or other module, and many equivalent embodiments could include different and/or additional features, components or other modules as desired.

The runtime application generator 1120 dynamically builds and executes the virtual applications 1128 in response to specific requests received from the client devices 1140. The virtual applications 1128 are typically constructed in accordance with the tenant-specific metadata 1138, which describes the particular tables, reports, interfaces and/or other features of the particular application 1128. In various embodiments, each virtual application 1128 generates dynamic web content that can be served to a browser or other client program 1142 associated with its client device 1140, as appropriate.

The runtime application generator 1120 suitably interacts with the query generator 1114 to efficiently obtain multi-tenant data 1132 from the database 1130 as needed in response to input queries initiated or otherwise provided by users of the client devices 1140. In a typical embodiment, the query generator 1114 considers the identity of the user requesting a particular function (along with the user's associated tenant), and then builds and executes queries to the database 1130 using system-wide metadata 1136, tenant specific metadata 1138, pivot tables 1134, and/or any other available resources. The query generator 1114 in this example therefore maintains security of the common database 1130 by ensuring that queries are consistent with access privileges granted to the user and/or tenant that initiated the request. In this manner, the query generator 1114 suitably obtains requested subsets of data 1132 accessible to a user and/or tenant from the database 1130 as needed to populate the tables, reports or other features of the particular virtual application 1128 for that user and/or tenant.

Still referring to FIG. 11, the data processing engine 1112 performs bulk processing operations on the data 1132 such as uploads or downloads, updates, online transaction processing, and/or the like. In many embodiments, less urgent bulk processing of the data 1132 can be scheduled to occur as processing resources become available, thereby giving priority to more urgent data processing by the query generator 1114, the search engine 1116, the virtual applications 1128, etc.

In exemplary embodiments, the application platform 1110 is utilized to create and/or generate data-driven virtual applications 1128 for the tenants that they support. Such virtual applications 1128 may make use of interface features such as custom (or tenant-specific) screens 1124, standard (or universal) screens 1122 or the like. Any number of custom and/or standard objects 1126 may also be available for integration into tenant-developed virtual applications 1128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 1126 such as "account" objects, "opportunity" objects, "contact" objects, or the like. The data 1132 associated with each virtual application 1128 is provided to the database 1130, as appropriate, and stored until it is requested or is otherwise needed, along with the metadata 1138 that describes the particular features (e.g., reports, tables, functions, objects, fields, formulas, code, etc.) of that particular virtual application 1128. For example, a virtual application 1128 may include a number of objects 1126 accessible to a tenant, wherein for each object 1126 accessible to the tenant, information pertaining to its object type along with values for various fields associated with that respective object type are maintained as metadata 1138 in the database 1130. In this regard, the object type defines the structure (e.g., the formatting, functions and other constructs) of each respective object 1126 and the various fields associated therewith.

Still referring to FIG. 11, the data and services provided by the server 1102 can be retrieved using any sort of personal computer, mobile telephone, tablet or other network-enabled client device 1140 on the network 1145. In an exemplary embodiment, the client device 1140 includes a display device, such as a monitor, screen, or another conventional electronic display capable of graphically presenting data and/or information retrieved from the multi-tenant database 1130. Typically, the user operates a conventional browser application or other client program 1142 (e.g., client application 107) executed by the client device 1140 to contact the server 1102 via the network 1145 using a networking protocol, such as the hypertext transport protocol (HTTP) or the like. The user typically authenticates his or her identity to the server 1102 to obtain a session identifier ("SessionID") that identifies the user in subsequent communications with the server 1102. When the identified user requests access to a virtual application 1128, the runtime application generator 1120 suitably creates the application at run time based upon the metadata 1138, as appropriate. As noted above, the virtual application 1128 may contain Java, ActiveX, or other content that can be presented using conventional client software running on the client device 1140; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

For the sake of brevity, conventional techniques related to querying and other database functions, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method comprising:
   receiving, at a server of a database system, a graphical representation of a validation process from a client device coupled to a network, the graphical representation comprising an arrangement of process symbology defining the validation process;
   identifying a user-configured triggering criterion for the validation process based on the graphical representation of the validation process;
   generating, at the server, a source code representation of the validation process based on the arrangement of process symbology defining the validation process;
   converting the source code representation to object model code corresponding to the validation process;
   storing the object model code corresponding to the validation process at the database system in association with a database object type by integrating the object model code with process code that may be executed in a virtual machine environment to perform the validation process in response to an action with respect to an instance of the database object type during execution of the process code; and in response to the action with respect to the instance of the database object type in a database of the database system, performing the validation process defined by the arrangement of process symbology with respect to the instance of the database object type using the object model code integrated with the process code when the user-configured triggering criterion is satisfied.

2. The method of claim 1, wherein storing the object model code comprises creating a flow object in the database, wherein the flow object is associated with the object model code.

3. The method of claim 2, further comprising:
obtaining, at the database system, source code from a second client device coupled to the network;
identifying, at the database system, a reference to the flow object;
retrieving the object model code associated with the flow object using the reference; and
compiling the source code by including the object model code at a location corresponding to the reference within the source code.

4. The method of claim 1, further comprising identifying a user-configured notification associated with the validation process based on the graphical representation of the validation process, wherein performing the validation process comprises generating the user-configured notification based on one or more fields of the instance of the database object type.

5. The method of claim 1, further comprising identifying a custom object type associated with the validation process based on the graphical representation of the validation process, wherein performing the validation process comprises performing the validation process with respect to an instance of the custom object type using the object model code in response to the action with respect to the instance of the custom object type.

6. The method of claim 1, further comprising providing, by the server, a visual process builder graphical user interface (GUI) display within an instance of a virtual application at the client device, wherein receiving the graphical representation of the validation process comprises receiving the arrangement of process symbology defined by a user within a design region of the visual process builder GUI display.

7. A non-transitory computer-readable medium having instructions stored thereon that is executable by a processing system of the server to perform the method of claim 1.

8. A method comprising:
receiving, at a database system, a graphical representation of a validation process, the graphical representation comprising an arrangement of process symbology defining the validation process;
identifying a user-configured triggering criterion for the validation process based on the graphical representation of the validation process;
generating, at the database system, a source code representation of the validation process based on the arrangement of process symbology defining the validation process;
converting the source code representation to object model code corresponding to the validation process;
storing the object model code corresponding to the validation process at the database system;

obtaining, at a server of the database system, source code from a client device coupled to a network;
identifying, at the server, a reference to the validation process maintained at the database system;
retrieving, by the server, the object model code corresponding to the validation process from the database system using the reference;
compiling, by the server, the source code to obtain a compiled version of the source code that may be executed in a virtual machine environment to perform the validation process in response to an action with respect to an instance of a database object type during execution, wherein the compiled version of the source code integrates the object model code corresponding to the validation process at a location of the reference within the source code;
storing, by the server, the compiled version of the source code in the database system; and
in response to the action with respect to the instance of the database object type in a database of the database system when the user-configured triggering criterion is satisfied, performing the validation process defined by the arrangement of process symbology with respect to the instance of the database object type using the object model code integrated within the source code.

9. The method of claim 8, wherein identifying the reference comprises identifying a flow function call within the source code.

10. The method of claim 9, the flow function call invoking an identifier associated with a flow object in the database system that corresponds to the validation process, wherein retrieving the object model code corresponding to the process comprises retrieving the object model code from the flow object using the identifier.

11. The method of claim 10, the flow function call including an input parameter, wherein compiling the source code comprises integrating the input parameter with the object model code corresponding to the validation process.

12. The method of claim 10, further comprising providing, by the server, a formula editor graphical user interface (GUI) display within an instance of a virtual application at the client device, wherein obtaining the source code comprises receiving the source code defined by a user within the formula editor GUI display.

13. A method comprising:
obtaining, by a server of a database system, a graphical representation of a validation process constructed by a user via a graphical interface on a client device using graphical representations of process steps, the graphical representation comprising an arrangement of process symbology defining the validation process, wherein one or more of the graphical representations of process steps are configurable to define at least one of triggering criteria and validation criteria associated with the validation process;
converting, by the server, the graphical representation of the validation process into a validation code block that may be executed in a virtual machine environment of the database system by generating a source code representation of the validation process based on the arrangement of process symbology and converting the source code representation into the validation code block;
storing, by the server, the validation code block in a storage device accessible to the virtual machine environment in association with a database object type;

constructing a process using the validation code block by integrating the validation code block with process code that may be executed in the virtual machine environment to perform the validation process in response to an action with respect to an instance of the database object type during execution of the process code; and in response to the action with respect to the instance of the database object type in a database of the database system, performing the validation process defined by the arrangement of process symbology with respect to the instance of the database object type using the validation code block integrated with the process code.

14. The method of claim 13, wherein:

storing the validation code block comprises storing the validation code block in association with a flow object in a database; and constructing the process using the validation code block comprises identifying a flow function call invoking the flow object in source code submitted to the database system.

15. The method of claim 13, wherein one or more of the graphical representations of process steps are configurable to define the database object type associated with the validation process.

* * * * *